United States Patent
Hollenbeck

(10) Patent No.: US 11,276,228 B2
(45) Date of Patent: Mar. 15, 2022

(54) 3D SCANNING WITH AUTOMATIC SELECTION OF SCAN STRATEGY

(71) Applicant: 3SHAPE A/S, Copenhagen K (DK)

(72) Inventor: Karl-Josef Hollenbeck, Copenhagen Ø (DK)

(73) Assignee: 3Shape A/S, Copenhagen K (DK)

( * ) Notice: Subject to any disclaimer, the term of this patent is extended or adjusted under 35 U.S.C. 154(b) by 58 days.

(21) Appl. No.: 16/981,384

(22) PCT Filed: Mar. 15, 2019

(86) PCT No.: PCT/EP2019/056548
§ 371 (c)(1),
(2) Date: Sep. 16, 2020

(87) PCT Pub. No.: WO2019/179889
PCT Pub. Date: Sep. 26, 2019

(65) Prior Publication Data
US 2021/0005017 A1    Jan. 7, 2021

(30) Foreign Application Priority Data

Mar. 22, 2018 (DK) .............. PA201870182

(51) Int. Cl.
*G06T 17/00* (2006.01)
*G06T 7/11* (2017.01)
*G06T 7/00* (2017.01)

(52) U.S. Cl.
CPC ............ *G06T 17/00* (2013.01); *G06T 7/0012* (2013.01); *G06T 7/11* (2017.01); *G06T 2207/10028* (2013.01); *G06T 2207/30036* (2013.01)

(58) Field of Classification Search
None
See application file for complete search history.

(56) References Cited

U.S. PATENT DOCUMENTS

2005/0271996 A1\* 12/2005 Sporbert .................. A61C 7/00
433/24
2015/0320320 A1    11/2015 Kopelman et al.
(Continued)

FOREIGN PATENT DOCUMENTS

| EP | 1774465 B1 | 4/2009 |
|---|---|---|
| WO | 2006031096 A1 | 3/2006 |
| WO | 2008014097 A1 | 1/2008 |

OTHER PUBLICATIONS

"Live All-in-One Scanning with 3Shape D2000". YouTube, Oct. 13, 2015, 3 pages, XP054979346.
(Continued)

*Primary Examiner* — Frank S Chen
(74) *Attorney, Agent, or Firm* — Buchanan Ingersoll & Rooney PC

(57) ABSTRACT

According to an embodiment, a method for 3D scanning at least a part of a surface of an object is disclosed. The method includes recording, using an optical scanner comprising at least one camera, one or more test 2D images of the at least a part of the surface of the object; automatically identifying a first segment of a first level of interest within the test 2D images, the first segment imaging a region of interest on the at least a part of the surface of the object; identifying a first 3D volume comprising the region of interest of the at least a part of the surface of the object; selecting a first input defining a first resolution and/or a first coverage; and 3D scanning the at least a part of the surface of the object within the first 3D volume using the first input.

20 Claims, 6 Drawing Sheets

(56) References Cited

U.S. PATENT DOCUMENTS

2018/0028294 A1     2/2018   Azernikov et al.
2019/0015177 A1*    1/2019   Elazar ................. A61C 9/0046

OTHER PUBLICATIONS

3Shape A/S, "3Shape Dental System 2016 User Manual". Jan. 1, 2016, pp. 1-1092.

M. Kazhdan et al., "Screened Poisson Surface Reconstruction", ACM Transactions on Graphics (ToG), vol. 32, No. 3, Article 29, Jun. 2013.

J. Long et al; "Fully Convolutional Networks for Semantic Segmentation", 2015 IEEE Conference on Computer Vision and Pattern Recognition (CVPR), Jun. 1, 2015, pp. 3431-3440.

C. Sinescu et al; "Dental Scanning In CAD/CAM Technologies: Laser Beams", Lasers in Dentistry XIV, vol. 6843, Feb. 7, 2008, pp. 1-9.

* cited by examiner

3D SCANNING WITH AUTOMATIC SELECTION OF SCAN STRATEGY

TECHNICAL FIELD

The disclosure generally relates to 3D scanning of an object to obtain a digital 3D representation of the object More particularly, the disclosure relates to method and 3D scanner configured for selecting a scan strategy based on an automatic identification of a region of interest of the object.

BACKGROUND

When an object is 3D scanned using an optical method, a digital 3D representation of the object can be derived from a series of 2D images each providing surface topography information for a portion of the object surface.

3D scanning may be based on several optical detection techniques, such as triangulation or focus scanning. Many triangulation 3D scanners use a laser beam to probe the object surface and exploit a 2D camera to look for the location of the reflection of the laser beam. Depending on how far away the laser strikes a surface, the laser beam appears at different places in the camera's field of view. This technique is called triangulation because the point where the laser beam impinges on the surface, the camera and the light source together form a triangle. Topography information for a larger portion of the object surface is recorded by sweeping the laser beam across the object. A patterned probe light beam illuminating an area of e.g. several square centimeters, instead of a single laser dot or line, may be used to speed up the acquisition process.

Several types of 3D scanners are commercially available, such as the D2000 scanner from 3 shape A/S, where the object to be scanned is arranged in a scan volume of the 3D scanner. In both restorative and orthodontic procedures, it is critical to identify a dental site where a prosthesis is to be provided. Typically, such identification of the dental site is performed manually by an operator. This not only makes the dental digital workflow slower but may make the identification operation vulnerable to human error. The disclosure provides a 3D scanner and a scanning method where an alternative to the conventional practice is disclosed.

SUMMARY

The disclosure relates to selecting a scan strategy, which allows for a faster scanning method, over conventionally available methods, by obviating some user interaction. The disclosed method provides sufficient resolution and coverage of regions of interest, while minimizing overall scanning time by avoiding scanning relatively less interesting regions of the object or scanning them with relatively poorer resolution and/or coverage than regions that are far more interesting. Here, a "region of interest" is a part of the surface of the scanned object.

Some operations/steps of the method described below and in the following may be implemented as an executable code and carried using a data processor or other processing means. The instructions may be provided as a computer program product loaded in a memory of the data processor, such as a RAM memory unit, from a computer readable storage medium or from another computer via a computer network. The described operations/steps may also be implemented by hardwired circuitry instead of software or in combination with computer program product.

According to an embodiment, a method for 3D scanning at least a part of a surface of an object is disclosed. The method includes recording, using an optical scanner comprising at least one camera, one or more test 2D images of the at least a part of the surface of the object; automatically identifying a first segment of a first level of interest within the test 2D images, the first segment imaging a region of interest on the at least a part of the surface of the object; identifying a first 3D volume comprising the region of interest of the at least a part of the surface of the object; selecting a first input defining a first resolution and/or a first coverage; and 3D scanning the at least a part of the surface of the object within the first 3D volume using the first input.

The term 3D scanning refers to scanning a physical object with a scanner employing 3D scanning techniques and resulting in generation of a digital 3D model of the physical object.

The region of interest may include regions that are relevant for designing a dental restorative or orthodontic device. For example, when the object is a dental model, i.e. a physical model of at least part of a patient's teeth, with one or more tooth preparations, the dentist or dental technician may want a high-resolution data for the preparation, in particular the margin lines of the prepared teeth, but lower resolution elsewhere. The dentist or dental technician may also want very good coverage of the preparations, while it is often admissible to have poorer coverage elsewhere. In another example where a dental model contains scan flags, these and any neighboring, such as immediately adjacent, teeth should generally be scanned with higher resolution and coverage than other parts of the dental model. Hence, in context of the disclosure, preparations and scan flags with or without the neighboring, such as immediately adjacent, teeth represent a few examples of regions of interest.

In an embodiment, the regions of interest on the object are detected based on an analysis of test 2D images of the object. As the region(s) of interest is part(s) of a 3D surface i.e. surface present in a 3D space, the test 2D images are analyzed so that parts that appear as a 3D region of interest would be present in a 2D image. An illustrative way to perform such analysis is to segment test 2D images, with a segment of interest indicating a region of interest on the object. The segmentation of the test 2D images is known process of partitioning a digital 2D image into multiple segments (for example, sets of pixels). The segmentation allows for simplifying the representation of the image into a more meaningful, thus makes it easier to analyze. Image segmentation may typically be used to locate objects and/or boundaries (lines, curves, etc.) in images. This may further include the process of assigning a label to pixels in an image such that pixels with the same label share certain characteristics, thus allowing for identification of regions of interest. Many image analysis methods are known from the literature, such as edge detection, feature recognition, or machine learning.

In another embodiment, the method further includes automatically identifying a second segment of a second level of interest within the one or more test 2D images, the second segment imaging a region of second level of interest on the at least a part of the surface of the object; identifying a second 3D volume comprising the region of second level of interest of the at least a part of the surface of the object; selecting a second input defining a second resolution and/or a second coverage; and 3D scanning the at least a part of the surface of the object within the second 3D volume using the second input.

The phrase "2D image" may refer to a 2D image of light reflected from the object and recorded by the camera. Any kind of illumination may be used, such as a uniform illumination by ambient light or uniform probe light from a light source, or a structured probe light beam emitted e.g. from a light source providing probe light in the form of a pattern comprising a number of structures, such as a number of lines. Typically optical 3D scanners use structured probe light for deriving 3D surface topography from 2D images. Several approaches to deriving 3D surface topography from 2D images are known in the art. These may include imaging principles of triangulation and confocal scanning for acquisition of 2D images, e.g., require illumination with structured light, while, e.g., stereo matching does not. 2D images from which the first segment and/or second segment is identified are referred as "test 2D images" and from which 3D surface topography is computed are referred as "data sets" or "scanning 2D images".

In context of the disclosure, the expression "scan strategy" refers to settings of one or more parameters or other inputs to the scanning procedure that determine the resolution with which some object surface is captured, and/or the coverage, i.e., the fraction of object surface area captured. Thus, selecting the first input/second input relates to adjusting one or more of these parameters. Typical such parameters may include number of data sets (scanning 2D images) in a view and/or the speed of the sweeping motion of a scan head of an optical 3D scanner. An example of other such inputs may include at least one of commands for the movements of axes, enabling a sequence of views. The strategy may be such that the settings are different for different parts of the scanning procedure, e.g. different for different views.

In an embodiment, the scan strategy is determined based on a single test 2D image, or a few 2D images, such as 2, 3, or 4 images, or up to 20 images, or up to some number that may be acquired in a time shorter than the time that would be needed to scan the object. It may be preferable to acquire the test 2D images from different look angles, i.e., relative orientations of the object and the camera. Note here that while the concepts of "look angle" and "view" both relate to the relative orientation of camera and object, only a single 2D test image is taken from a given look angle, while several data sets (scanning 2D images) are taken in a view. Test 2D images may be dedicated to just determining a scan strategy, or they may also be used as data sets, i.e. the test 2D image may be used in 3D scanning for generation of the 3D digital representation.

The term "view" may include a set of data sets (scanning 2D images) of the illuminated object, recorded by the camera under essentially a fixed relative spatial constellation of object and image acquisition unit, for the purpose of deriving some 3D surface topography of the scanned object. The relative spatial constellation may change in a limited fashion over the course of the data set (scanning 2D image) acquisition within a view, e.g., in some scanners whose illumination pattern is a small number of lines and whose camera and light source are combined in a scan head that performs a sweeping motion while the object remains stationary. In any case, only parts of the surface of an object may be imaged in a view. Generating a digital 3D representation of a substantial fraction of the object's surface topography from the 2D images will thus generally require more than one view.

A test single 2D image of the object may often be obtained within less than 20 ms and the following analysis can also be handled quickly by a data processing unit such that a scan strategy may often be selected in less than 1 second, i.e. much faster than a human operator could perform that task.

In an embodiment, automatic identification of the second segment includes identifying segments that are not identified as the first segment, i.e. segments other than the first segment. A data processor comprised in an optical 3D scanner may be configured to perform such automatic identification.

It is typically preferred that the first input defines the first resolution that is higher than the second resolution defined by the second input. This allows for 3D scanning the at least a part of the surface of the object within the first 3D volume with a higher resolution than part of the surface of the object within the second 3D volume.

A higher resolution and better coverage of some region on the surface of the object require relatively more data sets (scanning 2D images) of that region to be taken. A higher number of data sets (scanning 2D images) within a view may often provide better resolution. For example, in focus scanners, taking 2D images at small increments in the focus lens position will usually result in a better depth resolution. In structured light scanner with a scan head that performs a sweeping motion, taking 2D images at small increments of the sweeping position will result in a better lateral resolution. Most scanners also achieve better resolution in regions where multiple views overlap. Better coverage is generally achieved by more views and hence more 2D images in total. For dental objects with, e.g., screw holes or narrow interproximal gaps, it may be advantageous to record views that differ only slightly in the angle between object and image acquisition unit, thus increasing the chance of deep parts of the screw hole or gap being recorded in at least one view. The number of images per view and the number of views to record depend on the object type and may generally be found by experiment or through interpretation of historical data associated with earlier scans.

The 3D scanning may be configured to alternate, at least once, between the first input and second input. This allows for 3D scanning the at least a part of the surface of the object within the first 3D volume using the first input and within the second 3D volume using the second input. Such 3D scanning may be either continuous that is 3D scanning the entire object in one movement or intermittently that is 3D scanning the entire object in different steps, where the steps are interrupted by same or different time periods, typically very short time periods.

It is apparent that the disclosed method requires no or very little human user interaction for finding the scan strategy. The user need not annotate anything. In many embodiments, no first, often coarse, 3D digital representation of the object need be obtained before a scan strategy is found.

According to an embodiment, the method further includes performing at least one of automatically selecting the first input defining the first resolution and/or the first coverage; or automatically selecting the second input defining the second resolution and/or second coverage. The data processor comprised in the optical 3D scanner may be configured to perform such automatic selection. The method thus requires no or possibly very little human interaction for finding the scan strategy. In another embodiment, such selection may be performed manually. The data processor comprised in the optical 3D scanner may be configured to receive an input from a user to allow for manual selection.

According to an embodiment, the method further includes performing at least one of automatically identifying the first 3D volume comprising the region of interest of the at least a part of the surface of the object; or automatically identifying the second 3D volume comprising the region of second level of interest of the at least a part of the surface of the object. The data processor comprised in the optical 3D scanner may be configured to perform such automatic identification. The method thus requires no or possibly very little human interaction for finding the scan strategy. In another embodiment, such identification may be performed manually. The data processor comprised in the optical 3D scanner may be configured to receive an input from a user to allow for manual identification.

According to an embodiment, the 3D scanning includes projecting a beam of probe light into a scan volume; recording data sets comprising one or more first data sets and one or more second data sets of light received from the at least a part of the surface of the object placed in the scan volume; alternating, at least once, between the first input and second input to acquire the one or more first data sets within the first 3D volume using the first input and the one or more second data sets within the second 3D volume using the second unit, and combining one or more first data sets and one or more second data sets to provide a combined data set for generating a digital 3D representation of the at least a part of the surface of the object.

The 3D scanning of the at least a part of the surface of the object within the first 3D volume using the first input may include acquiring one or more first data sets; and generating a digital 3D representation using one or more first data sets of the at least a part of the surface of the object with the region of interest represented with a first higher resolution.

The 3D scanning of the at least a part of the surface of the object within the second 3D volume using the second input may include acquiring one or more second data sets; and generating a digital 3D representation using one or more second data sets of the at least a part of the surface of the object with the region of second level of interest represented with a second lower resolution.

The method may further include generating a digital 3D representation of the at least a part of the surface of the object by combining the digital 3D representation generated using the one or more first data sets and the digital 3D representation generated using the one or more second data sets.

In an embodiment, the 3D scanning may be performed by an optical 3D scanner. The 3D scanning may include a light source, such as a laser or an LED or an array of LEDs, arranged to project probe light onto an object arranged in the scan volume of the 3D scanner and a camera. The probe light may be spatially structured, such as having a checkerboard pattern or line pattern, and may be monochromatic or colored. The scanner may have an optical system arranged to guide the probe light from the light source to the object in the scan volume and/or for guiding light reflected from the object to the camera. The scanner may further include one or more linear or rotational axes to move the object relative to the image acquisition unit and/or the illumination unit. The term camera is broadly used to include other image acquisition units such as a CCD chip.

The partial digital 3D representations formed for views are typically combined to generate the digital 3D representation using computer implemented algorithms. Registration of partial digital 3D representations to a common coordinate system may be performed, e.g., by the Iterative Closest Point algorithm. Finding a common surface in 3D of registered partial 3D representations and hence the digital 3D representation of the object can be performed by surface reconstruction algorithms, e.g., see Kazhdan, Michael, and Hugues Hoppe. "Screened Poisson surface reconstruction." ACM Transactions on Graphics (ToG) 32.3 (2013): 29. The digital 3D representation is often a triangle mesh. The resolution of digital 3D representation, e.g., the size of triangles in a mesh, can differ for different regions of its surface.

In an embodiment, the method includes identifying the first 3D volume comprising the region interest and/or the second 3D volume comprising the region of second level of interest in dependence of a model of the at least one camera.

In an embodiment, identifying the first segment and/or the second segment comprises includes the one or more test 2D images using image segmentation. The image segmentation may be performed using a machine learning algorithm. Such machine learning algorithm may be based at least partly on a convolutional neural network.

In an embodiment, the object may be illuminated using an ambient light when recording the one or more test 2D images.

The method may also include automatically adjusting exposure of the at least one camera.

The same at least one camera may be used for both acquiring one or more test 2D images and to acquire images for 3D scanning.

In an embodiment, the first 3D volume comprising the region of interest of the object may be identified using a digital 3D representation using the one or more test 2D images.

According to an embodiment, an optical 3D scanner configured to record geometry data of an object placed in a scan volume is disclosed. The scanner includes a scanning unit comprising a light source arranged to project a beam of probe light into the scan volume, and at least one camera arranged to record one or more data sets of light received from the object placed in the scan volume. The optical 3D scanner further includes a control unit comprising a data processor configured to provide instructions to the at least one camera to record one or more test 2D images of an at least a part of the surface of the object, automatically identify a first segment of a first level of interest within the test 2D images, the first segment imaging a region of interest on the at least a part of the surface of the object, identify a first 3D volume comprising the region of interest of the at least a part of the surface of the object, select a first input defining a first resolution and/or a first coverage, and provide instructions to the optical scanning unit to perform 3D scanning of the at least a part of the surface of object within the first 3D volume using the first input.

In an embodiment, the data processor may be configured to automatically identify a second segment of a second level of interest within the one or more test 2D images, the second segment imaging a region of second level of interest on the at least a part of the surface of the object; identify a second 3D volume comprising the region of second level of interest of the at least a part of the surface of the object; select a second input defining a second resolution that is lower than the first resolution and/or a second coverage; and provide instructions to the optical scanning unit to perform 3D scanning said object within the second 3D volume using the second input.

In an embodiment, the data processor may be configured to automatically identify the first segment, and then identify the second segment to include segments that are not identified as the first segment, i.e. segments other than the first segment.

In an embodiment, during the 3D scanning, the light source is configured to project a beam of probe light into the scan volume; the at least one camera configured to record data sets comprising one or more first data sets and one or more second data sets of light received from the at least a part of the surface of the object placed in the scan volume. The data processor is configured to provide instructions to the scanning unit to alternate, at least once, between the first input and second input to acquire the one or more first data sets within the first 3D volume using the first input and the one or more second data sets within the second 3D volume using the second unit, and combine one or more first data sets and one or more second data sets to provide a combined data set for generating a digital 3D representation.

The data processor may be configured to analyze the one or more test 2D images using image segmentation for identifying the first segment and/or the second segment. Such image segmentation is preferably performed using a machine learning algorithm, which may be based at least partly on a convolutional neural network.

In an embodiment, the regions of interest on the object are detected based on an analysis of test 2D images of the object. As the region(s) of interest is part(s) of a 3D surface, the test 2D images need to be analyzed so that parts that appear as a 3D region of interest would be present in a 2D image. One way to perform such analysis is to segment test 2D images, with a segment of interest indicating a region of interest on the object. Many image analysis methods are known from the literature, such as edge detection, feature recognition, or machine learning.

One way to perform analysis is to segment test 2D images, with a segment of interest indicating a region of interest on the object. Many image analysis methods are known from the literature, such as edge detection, feature recognition, or machine learning.

In context of this disclosure, machine learning is preferred as it is well-suited for the image analysis. Any kind of machine learning algorithm may be used. Some examples of machine learning algorithms include artificial neural networks, such as deep artificial neural networks, convolutional artificial neural networks, or recurrent artificial neural networks. The machine learning method may apply dimensionality reduction methods, such as principle component analysis or auto encoders. An example of a machine-learning algorithm suitable for segmenting 2D images according to an embodiment is disclosed in Long J, Shelhamer E, Darrell T. Fully convolutional networks for semantic segmentation. In Proceedings of the IEEE Conference on Computer Vision and Pattern Recognition 2015 (pp. 3431-3440), particularly in sections 3 to 4.2.

The machine learning algorithm may be trained in a supervised manner, using human-annotated test 2D images. When determining the scan strategy, the machine learning algorithm runs in inference mode, segmenting the test 2D images.

While machine learning methods may be robust towards different object orientations and size in test 2D images, they usually require less training if it can be assumed that objects of a given type are always placed in approximately the same way in the scanner. The user of the scanner may be instructed to do so. Likewise, always taking test 2D images from approximately the same look angles will reduce the training burden. For dental models, an occlusal look angle generally reveals preparations and scan flags well, possibly complemented by an oblique frontal look angle. A dental technician will generally be able to advise on which look angles best reveal regions of interest.

Once a segment of interest found in one or more test 2D images, the volume in 3D space that contains the corresponding region of interest is derived from the segments. It should be noted that given only 2D images, it is not possible to exactly find the 3D region of interest on the object to be scanned, namely because it is not scanned yet at this point. A small region of interest relatively closer to a camera could appear in a test 2D image very similar as a larger region of interest of same shape, but relatively further away from the camera.

Even though the region of interest may not be found exactly with the test 2D images, it is still helpful to know that said region of interest is contained in a constrained volume in 3D space, i.e., in a volume that is smaller than the scannable volume. A scan strategy determined for a presumed surface in, e.g., the middle of said smaller volume, will generally provide similar resolution if the actual surface, i.e., the region of interest, turns out to be slightly further away or closer to the camera. The same argument holds for coverage.

A way, according to an embodiment, to obtain a volume containing the region of interest from a segment of interest within a single 2D test image is to find the typically cone-shaped volume in 3D space that is imaged to said segment. If two or more 2D test images are available, each obtained from a known position and orientation, the imaged volume in 3D space can be found for each of them. Then, the region of interest must be contained in the intersection of all these volumes. For scanners with multiple image acquisition units with a known constellation, the above procedure is particularly fast, because the object need not be moved to be seen from multiple positions and orientations. A camera model, such as a pinhole model, will improve accuracy in all above approaches.

The volume containing the region of interest may be constrained further from knowledge of the type of object. E.g., dental gypsum models always have approximately the same height and human teeth have approximately the same dimensions. The variability of these dimensions is generally much smaller than the extreme length of most scanners' scannable volume, so such approximations are generally acceptable. Knowledge of the type of object can be obtained from some order information, or by other analysis of the test 2D images, such as feature or object recognition.

The volume containing the region of interest may even be constrained at least approximately to the actual region of interest when first recording a coarse, 3D digital representation of the object, as is done in the method of the state of the art.

In case multiple segments of interest are found in multiple test 2D images, e.g., when there are multiple preparations on a gypsum model, the correct volume intersections must be found by identifying a region of interest in all images, i.e., by matching segments of interest. This is a correspondence problem whose solution is well known from the art, as it is the same kind of problem that is solved during 3D scanning with multiple cameras.

It should be noted that typically, regions of interest need not be found very accurately in many scanning applications and may include additional region such as regions neighboring (such as immediately adjacent) to the region of interest. For the example of preparations or scan flags, it may be generally a good approach to err on the conservative side, i.e., to assume a region of interest that is larger than the preparations or scan flags alone. With this approach, some parts of the dental model may be scanned with unnecessarily high resolution, but it is very likely that the true region of interest will be scanned with the required high resolution. With the scanners known in the art, humans tend to annotate regions of interest on a coarse first 3D digital representation also with a conservative approach.

It is typically preferred to follow a conservative approach as it helps with situations where a part of a region of interest is occluded by another part of the dental model, i.e., where it is not imaged fully in a test 2D image. It also helps to minimize any effect of not knowing exactly where in the constrained volume the region of interest is located.

It is generally acknowledged that unless a first 3D representation is recorded, the method may require a higher degree of conservatism than the method of the state of the art with its two steps of recording a first 3D representation and then having a user annotate a region of interest thereon. Hence the method may often require more 2D scanning images to be taken than the method of the state of the art. However, in general, much more time is gained by obviating at least one of the two steps of the method of the state of the art than is needed to acquire a more 2D scanning images.

The conservative approach is illustrated in an embodiment disclosing a method includes a method for 3D scanning at least a part of a surface of an object. The method includes recording, using an optical scanner comprising at least one camera, one or more test 2D images of the at least a part of the surface of the object; automatically identifying a first segment of a first level of interest within the test 2D images, the first segment imaging a region of interest comprising regions neighboring (such as immediately adjacent) to the region of interest on the at least a part of the surface of the object; identifying a first 3D volume comprising the region of interest of the at least a part of the surface of the object; selecting a first input defining a first resolution and/or a first coverage; and 3D scanning the at least a part of the surface of the object within the first 3D volume using the first input. The region of interest comprising regions neighboring to the region of interest may be referred as an extended region of interest.

It may also be advantageous to remove a background from test 2D images prior to determining regions of interest. Scanners usually have black surface to avoid stray reflections which can lead to erroneous 3D representations. Accordingly, parts of a test 2D image that are black or have a low pixel value can be masked. Dental gypsum models usually appear much brighter on the images, i.e. have higher pixel values, so a differentiation between object and background is typically simple.

The scan strategy may also be derived partly from information accompanying the object, e.g., an order form, besides the 2D test images. E.g., if the order form specifies that exactly one tooth has been prepared by the dentist, the test 2D image segmentation can exploit the knowledge that there can only be one segment of interest.

The knowledge about regions of interest gained during finding the scan strategy may also be exploited as input to a surface reconstruction algorithm. For example, it is natural that regions of interest are not only should be scanned with higher resolution but during the 3D scanning, may also be tessellated with smaller triangles than other regions.

When the light source is multi-chromatic, and the image acquisition unit is capable of detecting colors, e.g. a color camera using a Bayer filter, the color of the object may be determined from the test 2D images. This knowledge can be applied when the 3D scanner can adjust the color of the probe light. For example, it can be advantageous to use probe light comprising light with the color of the scanned object to reduce scanning time.

In some embodiments, ambient light is used to illuminate the object when recording the one or more test 2D images.

In other embodiments, the scanner's illumination unit that also performs 3D scanning is used as illumination source for the test 2D images. In other embodiments, the scanner has a dedicated light source for the test 2D images.

In some embodiments, the scan strategy relates to the scan speed, where the scan speed e.g. may be adjusted depending on the demanded level of detail in the scanning. The higher level of detail the reduce the scan speed. The scan speed can be adjusted differently for different parts of the scanned object.

In some embodiments, the scan strategy involves the step length in a step-wise scanning procedure.

In some embodiments, the image acquisition unit of comprises one camera which records both at least part of the test 2D images for selecting the scan strategy and at least part of the scanning 2D images recorded for the digital 3D representation of the object.

In some embodiments, the one or more test 2D images used for selecting the scan strategy are also used when generating the digital 3D representation of the object.

In some embodiments, more than one object is placed in the scan volume and scanned during one run with the 3D scanner, i.e. all the objects are scanned sequentially or simultaneously before a new set of objects are placed in the scan volume. In such cases the method may comprise determining and applying different scan strategies for the different objects.

In an embodiment, there exists more than two levels of interest. Besides regions of interest, there may be regions of one or more lesser degrees of interest, and others of no interest at all. The steps described above can simply be extended to a larger number of levels of interests, with each being treated separately. For example, if an order form specifies a three-unit bridge, the two dies could have the highest level of interest, the gingiva in between the dies an intermediate level of interest, and the remainder a standard level of interest, i.e., be scanned with the lowest resolution.

Thus, according to an embodiment, the method includes recording, using the optical scanner comprising at least one camera, one or more test 2D images of the at least a part of the surface of the object; automatically identifying a first segment of a first level of interest and more than one segments of more than one subsequent levels of interest within the test 2D images, the first segment and more than one segments imaging a region of interest and regions of more than one subsequent level of interest on the at least a part of the surface of the object; identifying a first 3D volume comprising the region of interest and more than one 3D volumes of the at least a part of the surface of the object; selecting a first input defining a first resolution and/or a first coverage and more than one inputs defining a plurality of resolutions and/or coverages; and 3D scanning the at least a part of the surface of the object within the first 3D volume using the first input and more than one 3D volumes using the more than one inputs. The first resolution is typically higher than each of the plurality of resolutions.

The disclosed optical 3D scanner and 3D scanning method may provide a fully automatic 3D scanner system where e.g. the system additionally comprises a positioning means such as a conveyor belt or robotic arm that is configured to position the object into the scan volume of the 3D scanner. Thereafter, the optical 3D scanner initiates the method for 3D scanning at least a part of a surface of an object, as disclosed and later claimed in claim 1.

According to an embodiment, a computer program product comprising program code for causing a data processor to perform the method according to any one or more of the embodiments is disclosed. In particular, the computer program product is embodied in a non-transitory computer readable medium. In one such embodiment, the computer program product includes computer readable program code that is executable by a hardware data processor to cause the hardware data processor to provide instructions to at least one camera to record one or more test 2D images of an at least a part of the surface of the object placed in a scan volume; automatically identify a first segment of a first level of interest within the test 2D images, the first segment imaging a region of interest on the at least a part of the surface of the object; identify a first 3D volume comprising the region of interest of the at least a part of the surface of the object; select a first input defining a first resolution and/or a first coverage; and provide instructions to an optical scanning unit comprising a light source and the at least once camera to perform 3D scanning of the at least a part of the surface of object within the first 3D volume using the first input.

BRIEF DESCRIPTION OF THE DRAWINGS

The embodiments of the disclosure, together with its advantages, may be best understood from the following illustrative and non-limiting detailed description taken in conjunction with the accompanying figures in which.

DETAILED DESCRIPTION

In the following description, reference is made to the accompanying figures, which show by way of illustration how the invention may be practiced.

Figure 1:
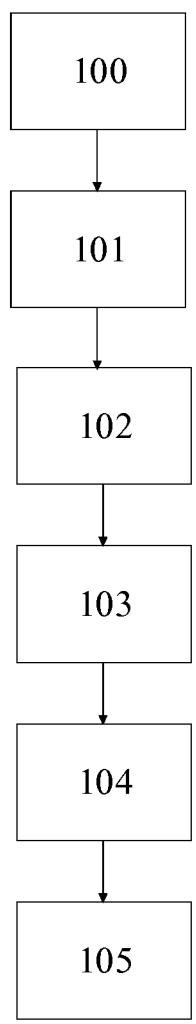
FIG. 1 illustrates a workflow according to an embodiment of the disclosure.

FIG. 1 illustrates a method, according to an embodiment, for a 3D scanning at least a part of a surface of an object using a scan strategy determined based on test 2D images of the object.

Figure 2:
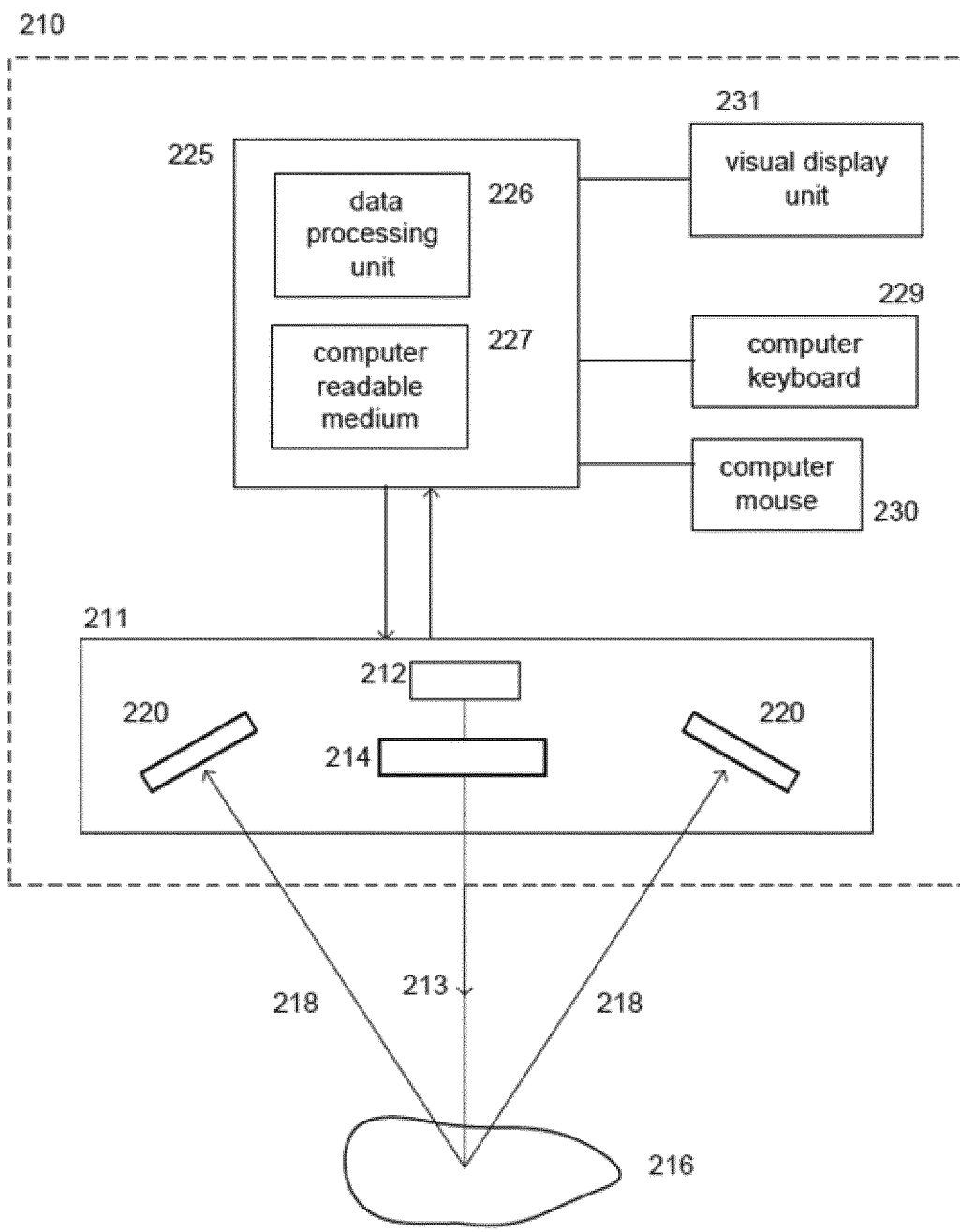
FIG. 2 illustrates a 3D scanner according to an embodiment of the disclosure.

The user may place an object, at 100, inside the scannable volume of a 3D scanner, such as the optical 3D scanner illustrated in FIG. 2. Other ways to automatically position the object such as a conveyer system or robotic arm may also be utilized. Preferably, the user is given and follows instructions on how to place the object in a certain orientation. If the object is a dental model, the instruction may include placing the facial side pointing towards a guiding point in the scanner, with the occlusal side pointing upwards towards at least one camera of the 3D scanner.

At 101, one or more test 2D image of the at least a part of the surface of the object is recorded using the optical scanner that comprises at least one camera. It is preferable to record at least two test 2D images such as to be able to more restrict the volume in which the region of interest is contained. It may also be useful to use two cameras (FIG. 2, 220), because two test 2D images can be obtained while the object remains stationary. It may however be even more useful to also move a platform (FIG. 2, 217) so allow the object to be seen from more look angles, e.g., such as to take test 2D images from an oblique frontal look angle.

At 102, the test 2D images are analyzed to identify segments of interest. Details are described below. The test 2D images may also be used to find appropriate settings for the illumination unit (FIG. 2, 212) to be used during the 3D scanning, such as intensity in order not to saturate images. Thus, at 102, a first segment of a first level of interest within the test 2D images is automatically identified, i.e. requiring no user interaction. The first segment images a region of interest on the at least a part of the surface of the object At 103, a volume containing the region of interest is identified from the segments of interest. Details are described below. Thus, at 103, a first 3D volume comprising the region of interest of the at least a part of the surface of the object is identified. Preferably, such identification is automatic and requires no user interaction.

At 104, a scan strategy is computed that provides higher resolution and/or coverage of the region(s) of interest. The higher resolution may be achieved by performing the sweeping motion of a scan head (FIG. 2, 211) in smaller increments while recording a view. Higher coverage may be achieved by performing at least one of moving the object in smaller increments between views, or by increasing the number of views. In the preceding text, "smaller" refers to smaller than for other regions of the object or smaller than in a standard scan strategy. The scan strategy is then executed as described later for FIG. 2. 104 is preferably automatic, i.e., preferably requires no user interaction. The scan strategy may thus be represented as a first input defining a first resolution and/or first coverage.

At 105, 3D scanning of the at least a part of the surface of the object within the first 3D volume using the first input is performed, resulting in generation of 3D digital representation of region of interest.

FIG. 2 illustrates an optical 3D scanner according to an embodiment of the disclosure. The 3D scanner 210 contains a 3D scan head 211 including an illumination unit/light source 212 that is configured to provide a beam of probe light 213. The probe light may be arranged to pass through a beam shaping optics 214 when propagating towards the object 216 to be scanned. The object is arranged in a scan volume of the 3D scanner. The scan head also includes an image acquisition unit which in this embodiment is represented by two cameras 220. The cameras are configured to receive light 218 reflected from the object 216 such that 2D images of the reflected light are recorded on an image sensor of the cameras. The object is typically placed by the user on a platform 217 with two axes for rotation and inclination, allowing obtaining various views. The scan head 211 may be configured to perform a sweeping motion along a linear axis for recording a view. In other embodiments, the beam shaping optics is configured provide for a sweeping movement.

The control unit 225 includes a data processing unit 226 and a non-transitory computer readable medium 227 encoded with a computer program product with instructions for performing the procedure of selecting the scan strategy and for generating a digital 3D representation from the recorded data files (scanning 2D images).

Prior to generating the digital 3D representation of the object, the control unit 225 initially instructs the 3D scanning unit 211 to record one or more test 2D images using the cameras 220. The test 2D images may be recorded using ambient light such that the illumination unit 212 is inactive while the test 2D images are recorded. Alternatively, the test 2D images may be recorded using the light source 212. The recorded test 2D images are transferred to the control unit 225 where the data processing unit 226, e.g. a microprocessor, executes instructions for analyzing the test 2D images to determine one or more volumes containing a region of interest. Subsequently, a scan strategy for 3D scanning the object 216 is computed based at least partly on the determined volumes containing regions of interest. In an embodiment, the scan strategy may use pre-defined templates for various types of dental cases. The data processing unit 226 is configured to automatically identify a case type and the data processing unit 226 is also configured to access these templates to define the scan strategy. The case type may alternatively be defined by a user, such as from the order form. The templates are stored in a database that the data processing unit 226 is configured to access. The database may be either a component of the optical scanner or a remote database that the data processing unit may access. In another embodiment, the data processing unit 226 is configured to compute the scan strategy defining the resolution and/or coverage without using such templates. The data processing unit may also be configured to modify the template(s) such that the modified template(s) for defining scan strategy is available when same or substantially similar type of dental case is automatically identified/user defined in future 3D scanning of same or a different object.

Once the scan strategy is computed, the control unit 225 is configured to instruct the 3D scanning unit 211 to record a series of data files (scanning 2D images) of the object using the selected scan strategy. The recorded scanning 2D images are transferred to the control unit 225 where the digital 3D representation of the object is generated.

In an embodiment, where the 3D scanner utilizes a structured probe light beam, such as a spot or a line pattern, the light is detected in the acquired scanning 2D images and well-established projection geometry such as triangulation or stereo matching is used to derive the 3D coordinates for the object surface illuminated by the bright parts of the pattern. This may be performed for a sequence of different views, i.e., with the object 216 brought into different positions by the axes moving the platform 217 supporting the object.

The control unit may include any device or combination of devices that allows the data processing to be performed, such as a general-purpose computer capable of running a wide variety of different software applications or a specialized device limited to particular functions. The control unit may include any type, number, form, or configuration of processors, system memory, computer-readable mediums, peripheral devices, and operating systems. In some embodiments, the computer includes a personal computer (PC), which may be in the form of a desktop, laptop, pocket PC, personal digital assistant (PDA), tablet PC, or other known forms of personal computers.

In an embodiment, a system comprising the optical 3D scanner 210 and at least one access device and/or interface is disclosed. The at least one access device and/or interface is configured to allow the operator to utilize the functionality of the control unit. The access device and/or interface may include but is not limited to a keyboard 229, a mouse 230, a graphical user interface (GUI) displayed in a display screen 231, and other known input or output devices and interfaces.

Figure 3:
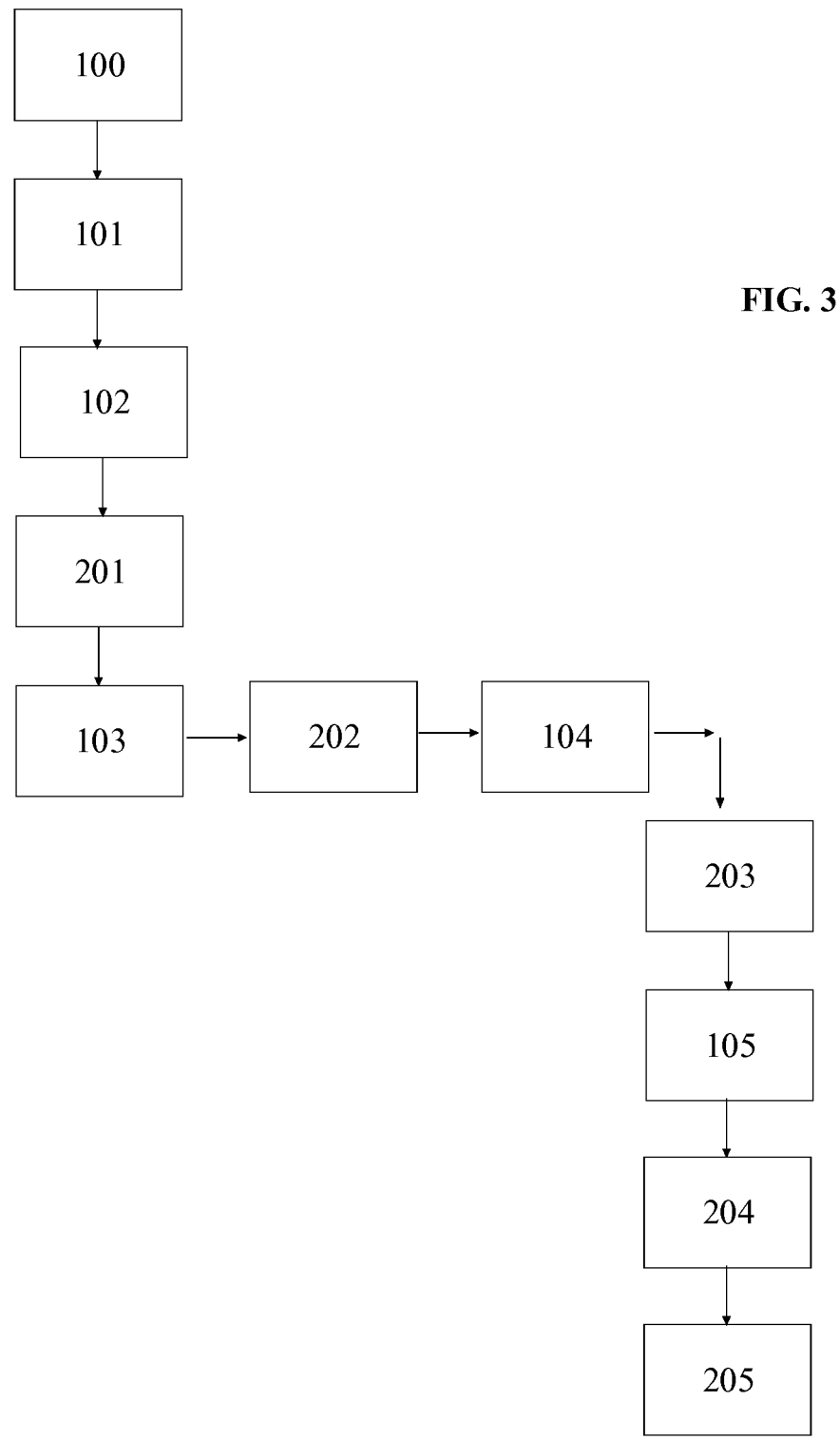
FIG. 3 illustrates a workflow according to an embodiment of the disclosure.

FIG. 3 illustrates a workflow according to an embodiment of the disclosure. The numerals that are same as the one included in FIG. 1 represent the same operation. Therefore, numerals 100, 101, 102, 103, 104 and 105 represent the operation as described earlier. Additionally, the method may include operations at 201 for automatically identifying a second segment of a second level of interest within the one or more test 2D images, the second segment imaging a region of second level of interest on the at least a part of the surface of the object. At 202, a second 3D volume comprising the region of second level of interest of the at least a part of the surface of the object is identified. At 203, a second input defining a second resolution and/or a second coverage is selected. The second resolution is lower than the first resolution that is defined by the first input. At 204, 3D scanning the at least a part of the surface of the object within the second 3D volume using the second input is performed. During this method, the 3D scanning is configured to alternate, at least once, between the first input and second input. This allows for generating 3D digital representation where the region of interest is represented in a higher resolution than the regions of second or subsequent level of interests. At 205, a 3D representation of the object is obtained by taking into consideration 3D scanning of the parts of object that are scanned using the first input and second input.

It is apparent that specific operations in the workflow are illustrated in a certain order. However, some of these operations in the illustrated workflow of FIG. 3 need not be performed in the illustrated order. For example, operation 103 may precede the operation 201; operation 104 may precede one or both operations 201 or 202; operations 201, 202, and 203 may be performed even prior to operation 103. In determining any possible ordering of the operations, these conditions may be considered i) operations 100 and 101 are performed prior to performing any other operation; ii) operations 102, 103, 104 are performed sequentially with or without interruption from any of the operations 201-204 but prior to the operation 105; iii) operations 201, 202, 203 are performed in sequentially with or without interruption from any of the operations 102-105 but prior to the operation 204.

Figure 4A:
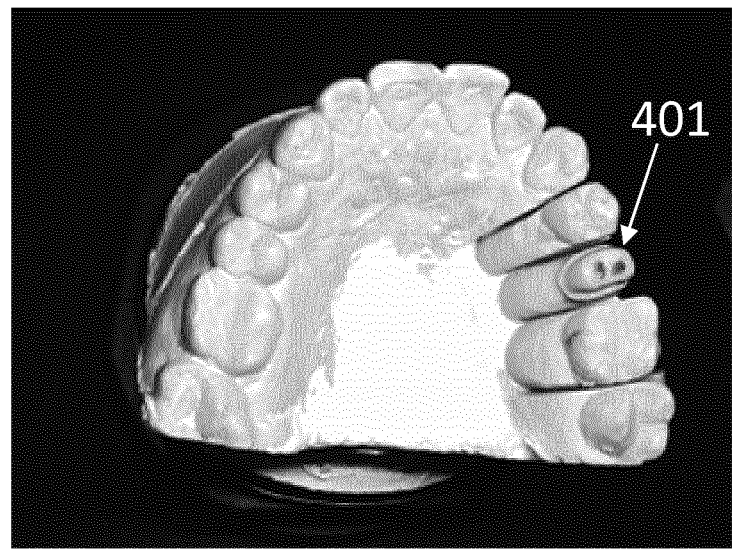
FIG. 4A illustrates a test 2D image recorded by a scanner according to an embodiment of the disclosure.
Figure 4B:
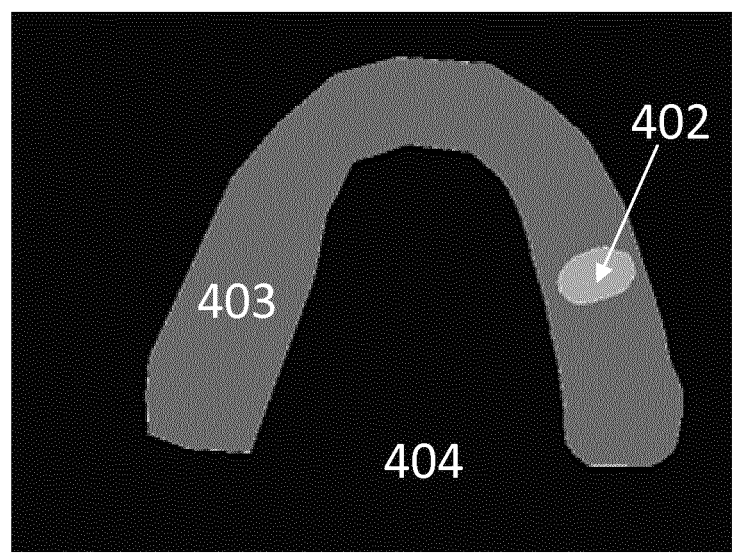
FIG. 4B illustrates an annotation according to an embodiment of the disclosure.

FIG. 4 illustrates how training test 2D images can be created for machine learning according to an embodiment of the disclosure. FIG. 4A illustrates a test 2D image recorded by the scanner camera 220. It shows a dental gypsum model of an upper jaw. The second premolar in the right half of the image 401 has a preparation, presumably for a crown. FIG. 4B illustrates an annotation according to an embodiment. FIG. 4B is normally created as an overlay layer of the image in FIG. 4A but is shown here separately for clarity purposes only. The segment with the preparation is marked as being of high interest, i.e. region of interest 402, while the remainder of the arch of teeth is marked as being of intermediate interest 403. The rest of the image 404 is marked as having no interest. Note that not just the background is deemed to have no interest, but also parts of the gypsum cast that do not show any anatomy or that show anatomy that is irrelevant for the case, i.e. for designing the crown, is marked of no interest.

Annotations may be expressed as integer values, expressing a class, here a level of interest, for each pixel. Annotations may also be expressed as one-high encodings, where every pixel is presented by a vector of length equal to the number of classes, with the element for the assigned class set to 1 and the other elements set to 0. In the illustration of FIG. 4B, there are three classes, representing the three levels of interest: high 402, intermediate 403, and no interest 403.

Figure 5:
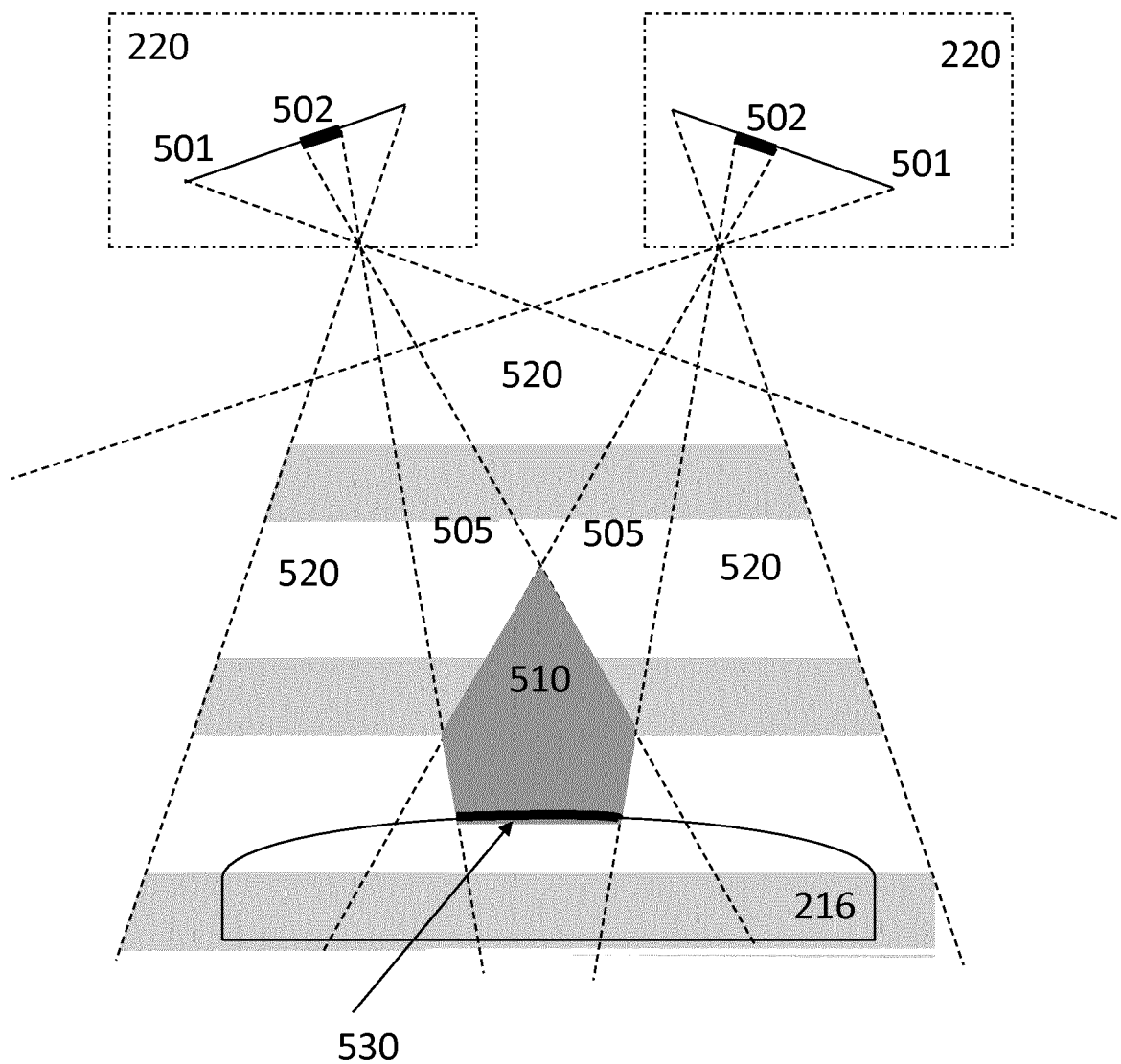
FIG. 5 illustrates how to obtain a volume containing a region of interest according to an embodiment of the disclosure.

FIG. 5 illustrates how to obtain a volume containing the region of interest from a segment of interest in each camera image according to an embodiment of the disclosure. The figure shows a cross-sectional view of relevant elements of the scanner. Each camera 220 includes an image sensor 501. The segment of interest corresponds to the stretch of pixels denoted 502 for each image sensor. The volume 505 imaged by pixels 502, again for each image sensor, is found from the camera model, such as a pinhole model, where the camera model is known from construction and/or calibration. The intersection of both volumes 501 is the volume 510 (shaded in dark gray) that must contain the region of interest 530 on the object. Note that volume 510 is much smaller than the total scannable volume 520 (shaded in light gray), so a substantial reduction in scan time can be expected.

Figure 6:
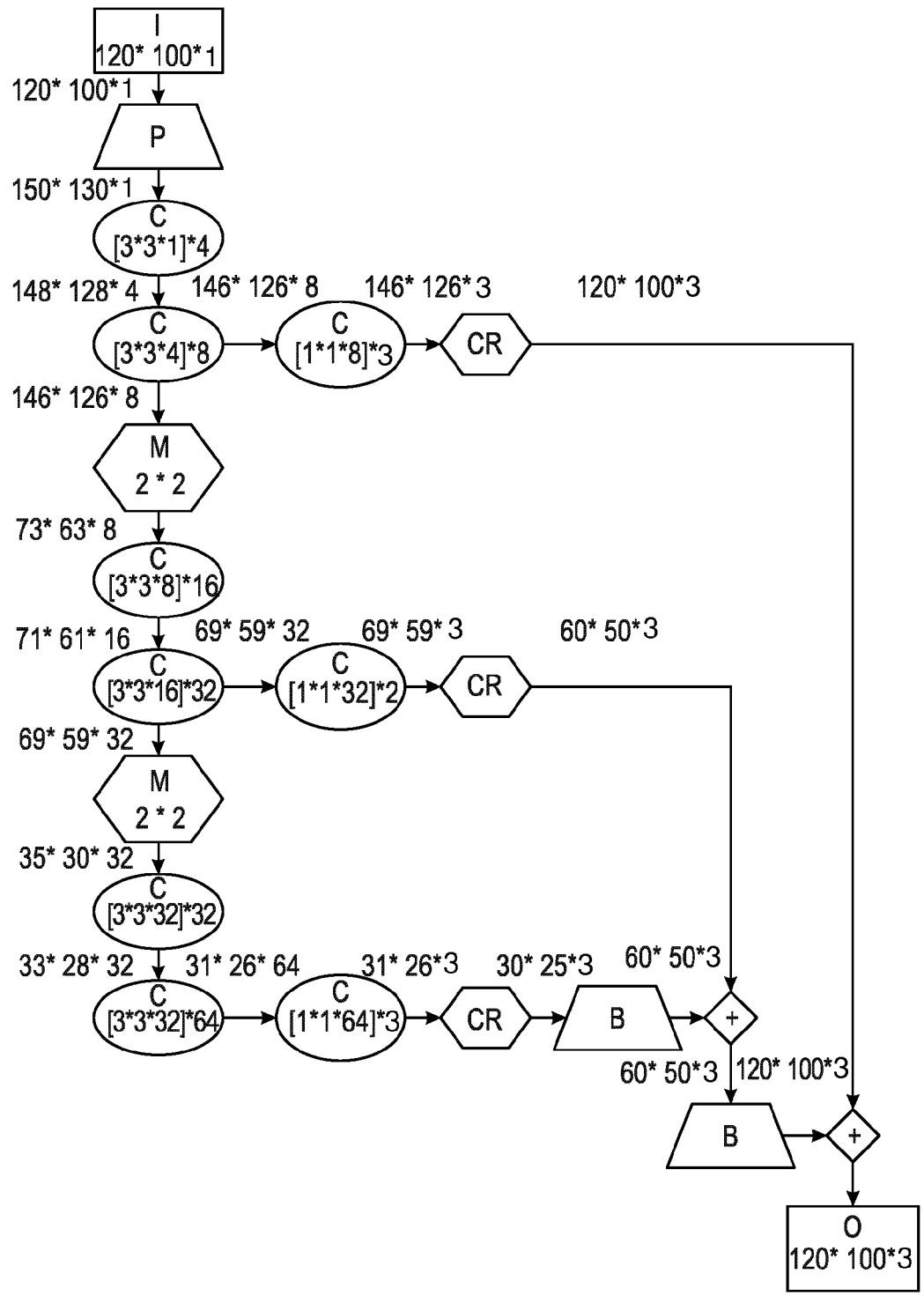
FIG. 6 illustrates a convolutional neural network according to an embodiment of the disclosure.

According to an embodiment, FIG. 6 illustrates an example architecture of a suitable convolutional neural network for pixel-wise segmentation of the test 2D images, assuming, as an example, the test 2D images to be 120 pixels wide and 100 pixels high. The input image, being a gray scale image, has 1 channel, pixel intensity. For the example, it is also assumed that there are the three levels of interest shown in FIG. 4, hence the output image has 3 channels.

I: the input test 2D image.

P: zero-padding with a 15-pixel width border around the image.

C: a convolutional layer followed by a rectified linear unit.

CR: a cropping layer to reduce size to fit the subsequent layer's operation

B: an upscaling layer, using a factor 2 and bilinear interpolation

M: a max-pooling layer

+: a layer for element-wise addition of corresponding channels

O: the output image.

The dimensions of data in the various layers and operations is also shown in FIG. 6. Many network architectures are possible. Preferably, the neural network has convolutional layers with small kernels, such as 3×3×M, where M is the number of channels.

In the example, the three output image channels each contain a score indicating the degree (measure) of belief of a pixel belonging to the class represented by a channel. It is convenient to use three output channels if the training data has them, too, i.e., used one-hot encoding, with 1 indicating perfect belief. Note that the convolutional neural network of FIG. 6 may not ensure output channel values to be in strictly the interval [0,1], so it may be useful to clip any values outside that interval.

In inference mode, i.e., at 102 (FIG. 1) of analyzing test 2D images provided by the scanner, a class for a pixel may be assigned corresponding to the largest score. It may also be possible to only assign a class if its score is clearly larger than the others and leave a classification for a pixel undefined if no score is clearly larger than the other.

Once the pixel-wise classification is obtained, segments of interest are found. Because the output image has the same width and height as the input image, pixels in both images with the same coordinate correspond to each other. In general, the neural network of FIG. 6 has been observed to produce contiguous segments of realistic size, i.e., only rarely does the network produce small islands or single pixels of one class in an area otherwise found to belong to another class. Should that occur, however, it is possible to post-process the output images such that, e.g., a minimum size of a segment is required.

Although some embodiments have been described and shown in detail, the disclosure is not restricted to such details, but may also be embodied in other ways within the scope of the subject matter defined in the following claims. In particular, it is to be understood that other embodiments may be utilized and structural and functional modifications may be made without departing from the scope of the present invention.

A claim may refer to any of the preceding claims, and "any" is understood to mean "any one or more" of the preceding claims.

It should be emphasized that the term "comprises/comprising/including" when used in this specification is taken to specify the presence of stated features, integers, operations, steps or components but does not preclude the presence or addition of one or more other features, integers, steps, components or groups thereof.

In 3D scanner claims enumerating several means, several of these means can be embodied by one and the same item of hardware. The mere fact that certain measures are recited in mutually different dependent claims or described in different embodiments does not indicate that a combination of these measures cannot be used to advantage.

The invention claimed is:

1. A method for 3D scanning at least a part of a surface of an object, the method comprising:
    recording, using an optical scanner comprising at least one camera, one or more test 2D images of the at least a part of the surface of the object;
    automatically identifying a first segment of a first level of interest within the test 2D images, the first segment imaging a region of interest on the at least a part of the surface of the object;
    identifying a first 3D volume comprising the region of interest of the at least a part of the surface of the object;
    selecting a first input defining a first resolution and/or a first coverage; and
    3D scanning the at least a part of the surface of the object within the first 3D volume using the first input.

2. The method according to claim 1, further comprising automatically identifying a second segment of a second level of interest within the one or more test 2D images, the second segment imaging a region of second level of interest on the at least a part of the surface of the object;
    identifying a second 3D volume comprising the region of second level of interest of the at least a part of the surface of the object;
    selecting a second input defining a second resolution and/or a second coverage; and
    3D scanning the at least a part of the surface of the object within the second 3D volume using the second input.

3. The method according to claim 1, wherein the first input defines the first resolution that is higher than the second resolution defined by the second input.

4. The method according to claim 1, wherein the 3D scanning is configured to alternate, at least once, between the first input and second input.

5. The method according to claim 1, wherein
    selecting the first input defining the first resolution and/or the first coverage is performed automatically; and/or
    selecting the second input defining the second resolution and/or second coverage is performed automatically.

6. The method according to claim 1, wherein
    identifying the first 3D volume comprising the region of interest of the at least a part of the surface of the object is performed automatically; and/or
    identifying the second 3D volume comprising the region of second level of interest of the at least a part of the surface of the object is performed automatically.

7. The method according to claim 1, wherein the 3D scanning comprises,
projecting a beam of probe light into a scan volume;
recording data sets comprising one or more first data sets and one or more second data sets of light received from the at least a part of the surface of the object placed in the scan volume;
alternating, at least once, between the first input and second input to acquire the one or more first data sets within the first 3D volume using the first input and the one or more second data sets within the second 3D volume using the second unit, and
combining one or more first data sets and one or more second data sets to provide a combined data set for generating a digital 3D representation of the at least a part of the surface of the object.

8. The method according to claim 1, wherein 3D scanning the at least a part of the surface of the object within the first 3D volume using the first input comprises
acquiring one or more first data sets; and
generating a digital 3D representation using one or more first data sets of the at least a part of the surface of the object with the region of interest represented with a first higher resolution.

9. The method according to claim 8, further comprising generating a digital 3D representation of the at least a part of the surface of the object by combining the digital 3D representation generated using the one or more first data sets and the digital 3D representation generated using the one or more second data sets.

10. The method according to claim 1, wherein 3D scanning the at least a part of the surface of the object within the second 3D volume using the second input comprises
acquiring one or more second data sets; and
generating a digital 3D representation using one or more second data sets of the at least a part of the surface of the object with the region of second level of interest represented with a second lower resolution.

11. The method according to claim 1, further comprising identifying the first 3D volume comprising the region interest and/or the second 3D volume comprising the region of second level of interest in dependence of a model of the at least one camera.

12. The method according claim 1, wherein identifying the first segment and/or the second segment comprises analyzing the one or more test 2D images using image segmentation.

13. The method according to claim 12, wherein the image segmentation is performed using a machine learning algorithm.

14. The method according to claim 13, wherein the machine learning algorithm is based at least partly on a convolutional neural network.

15. The method according to claim 1, further comprising illuminating the object using an ambient light when recording the one or more test 2D images.

16. The method according to claim 1, further comprising automatically adjusting exposure of the at least one camera.

17. The method according to claim 1, further comprising using the same at least one camera for both acquiring one or more test 2D images and to acquire images for 3D scanning.

18. The method according to claim 1, further comprising identifying the first 3D volume comprising the region of interest of the object using a digital 3D representation using the one or more test 2D images.

19. An optical 3D scanner configured to record geometry data of an object placed in a scan volume comprising
a scanning unit comprising
a light source arranged to project a beam of probe light into the scan volume, and
at least one camera arranged to record one or more data sets of light received from the object placed in the scan volume; and
a control unit comprising a data processor configured to: provide instructions to the at least one camera to record one or more test 2D images of an at least a part of the surface of the object,
automatically identify a first segment of a first level of interest within the test 2D images, the first segment imaging a region of interest on the at least a part of the surface of the object,
identify a first 3D volume comprising the region of interest of the at least a part of the surface of the object,
select a first input defining a first resolution and/or a first coverage, and provide instructions to the optical scanning unit to perform 3D scanning of the at least a part of the surface of object within the first 3D volume using the first input.

20. A computer program product embodied in a non-transitory computer readable medium, the computer program product comprising computer readable program code being executable by a hardware data processor to cause the hardware data processor to
provide instructions to at least one camera to record one or more test 2D images of an at least a part of the surface of the object placed in a scan volume;
automatically identify a first segment of a first level of interest within the test 2D images, the first segment imaging a region of interest on the at least a part of the surface of the object;
identify a first 3D volume comprising the region of interest of the at least a part of the surface of the object;
select a first input defining a first resolution and/or a first coverage; and
provide instructions to an optical scanning unit comprising a light source and the at least once camera to perform 3D scanning of the at least a part of the surface of object within the first 3D volume using the first input.

* * * * *